US006408872B1

(12) United States Patent
Skeens et al.

(10) Patent No.: US 6,408,872 B1
(45) Date of Patent: Jun. 25, 2002

(54) EVACUABLE CONTAINER HAVING ONE-WAY VALVE WITH FILTER ELEMENT

(75) Inventors: Janet L. Skeens, San Carlos; Gerald W. Sweeney, La Jolla, both of CA (US)

(73) Assignee: New West Products, Inc., San Diego, CA (US)

( * ) Notice: Subject to any disclaimer, the term of this patent is extended or adjusted under 35 U.S.C. 154(b) by 0 days.

(21) Appl. No.: 09/310,468

(22) Filed: May 12, 1999

Related U.S. Application Data (60) Continuation-in-part of application No. 08/851,361, filed on May 5, 1997, now Pat. No. 5,931,189, which is a continuation of application No. 08/423,761, filed on Apr. 17, 1995, now abandoned, which is a division of application No. 08/168,963, filed on Dec. 15, 1993, now Pat. No. 5,480,030.

(51) Int. Cl.⁷ .......................... F16K 15/14; B65D 81/20

(52) U.S. Cl. .................. 137/512.15; 137/550; 137/854; 141/65; 206/524.8; 383/103

(58) Field of Search .............................. 137/512.5, 854, 137/550; 141/65; 383/100, 103; 206/524.8

(56) References Cited

U.S. PATENT DOCUMENTS

| 2,821,338 A | 1/1958 | Metzger ..................... 229/62.5 |
| 2,913,030 A | 11/1959 | Fisher ........................... 150/52 |
| 3,060,985 A | 10/1962 | Vance et al. .................... 150/3 |
| 3,135,411 A | 6/1964 | Osborne ....................... 215/60 |
| 3,141,221 A | 7/1964 | Faulls, Jr. ..................... 24/30.5 |
| 3,313,444 A | 4/1967 | Katell ........................... 220/44 |
| 3,351,270 A | 11/1967 | Hohnjec ....................... 229/44 |
| 3,403,696 A | 10/1968 | Pynchon ................ 137/516.13 |
| 3,454,182 A | 7/1969 | Morton ......................... 220/44 |
| 3,574,306 A | 4/1971 | Alden ...................... 128/214.4 |
| 3,831,628 A | 8/1974 | Kintner et al. .......... 137/512.15 |
| 3,911,949 A | 10/1975 | Hilden et al. ................. 137/525 |
| 3,958,693 A | 5/1976 | Greene ........................ 206/455 |
| 4,082,201 A | 4/1978 | Bittel ........................... 220/339 |
| 4,209,485 A | 6/1980 | Greenspan ................... 264/242 |
| 4,212,337 A | 7/1980 | Kamp ............................. 150/3 |
| 4,372,921 A | 2/1983 | Sanderson et al. ........... 422/300 |
| 4,486,923 A | 12/1984 | Briggs ...................... 24/30.5 R |
| 4,712,574 A | 12/1987 | Perrott ......................... 137/217 |
| 4,747,702 A | 5/1988 | Scheibner ..................... 383/63 |
| 4,778,282 A | 10/1988 | Borchardt et al. ............. 383/63 |
| 4,786,285 A | 11/1988 | Jambor ........................ 604/342 |
| 4,812,056 A | 3/1989 | Zieke ........................... 383/65 |
| 4,871,264 A | 10/1989 | Robbins et al. ............... 383/68 |
| 4,892,414 A | 1/1990 | Ausnit ........................... 383/63 |
| 4,917,506 A | 4/1990 | Scheibner ..................... 383/63 |

(List continued on next page.)

FOREIGN PATENT DOCUMENTS

| DE | 3917344 A1 | 11/1990 | ........... B65D/33/16 |
| EP | 0342317 | 11/1989 | |
| EP | 0153044 | 11/1999 | |
| JP | 4-36940 | 6/1992 | ........... B65D/33/01 |
| JP | 4-189752 | 7/1992 | ........... B65D/33/01 |
| JP | 404189752 | 7/1992 | .............. 206/524.8 |
| JP | 4-242544 | 8/1992 | ........... B65D/33/01 |

OTHER PUBLICATIONS

Copy of Packaging of Vacuum Shrink Depositing Bags for Cotton Products from Beijing J2 Jia Li New Technology Developing Co.

*Primary Examiner*—John Rivell
(74) *Attorney, Agent, or Firm*—Skjerven Morrill LLP; Christopher B. Allenby (57) ABSTRACT

A one-way valve allows air to be drawn from a collapsible, flexible, air-tight bag using a vacuum source. When the vacuum source is removed, the one-way valve prevents air from re-entering the bag. A filter is placed on the valve body to prevent small particles from the bag from clogging the valve or the vacuum source.

11 Claims, 6 Drawing Sheets

U.S. PATENT DOCUMENTS

| | | |
|---|---|---|
| 5,063,639 A | 11/1991 | Boeckmann et al. .... 24/30.5 R |
| 5,067,822 A | 11/1991 | Wirth et al. ................... 383/61 |
| 5,080,155 A | 1/1992 | Crozier ....................... 150/154 |
| 5,111,938 A * | 5/1992 | Soprano et al. ...... 206/524.8 X |
| 5,121,590 A | 6/1992 | Scanlon ........................ 33/510 |
| 5,142,970 A | 9/1992 | ErkenBrack ................. 99/472 |
| 5,203,458 A | 4/1993 | Cornwell ................. 206/524.8 |
| 5,242,516 A | 9/1993 | Custer et al. .................. 156/66 |
| 5,282,322 A | 2/1994 | Kasuya ........................... 34/93 |
| 5,368,394 A | 11/1994 | Scott et al. .................... 383/63 |
| 5,371,925 A | 12/1994 | Sawatsky ................. 24/30.5 R |
| 5,397,182 A | 3/1995 | Gaible et al. .................. 383/63 |
| 6,070,728 A * | 6/2000 | Overby et al. ........... 206/524.8 |

* cited by examiner

EVACUABLE CONTAINER HAVING ONE-WAY VALVE WITH FILTER ELEMENT

REALTED APPLICATIONS

This application is a continuation-in-part of application Ser. No. 08/851,361 filed May 5, 1997, now issued as U.S. Pat. No. 5,931,189, which is a continuation of application Ser. No. 08/423,761 filed Apr. 17, 1995, now abandoned, which is a divisional of application Ser. No. 08/168,963 filed Dec. 15, 1993, now issued as U.S. Pat. No. 5,480,030.

FIELD OF THE INVENTION

The present invention relates to evacuable storage containers, and in particular to filters for one-way valves used in such storage containers.

BACKGROUND

Collapsible, evacuable storage containers typically include a flexible, air-tight bag, an opening through which to place an article in the bag, and a fixture through which to evacuate excess air. A user places an article into the bag through the opening, seals the opening, and then evacuates the air in the bag through the fixture. With the bag thus evacuated, the article contained therein may be significantly compressed so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

Not only large, compressible items such as clothing may be stored in a collapsible, evacuable storage container. For example, it may be desirable to store bulk items made of small particles, such as powders or granulated resins, in an evacuated container. One situation that commonly occurs is that a particular bulk item is shipped in a large, rigid container such as a drum. Bulk items may be moisture sensitive and are sealed against moisture during shipment. But many times a user does not need to use the entire contents of the large container, and so once exposed to air the remaining bulk contents quickly become unusable and are thus wasted.

One collapsible, reusable, evacuable storage container is shown in the above-referenced U.S. Pat. No. 5,480,030 issued to Sweeney et al., under common ownership with the present invention, and incorporated herein by reference in its entirety. The '030 patent discloses a one-way air valve assembly having a flexible diaphragm that seals against a valve seat. The valve assembly also has vanes positioned to prevent the bag material or bag contents from obstructing air holes or the diaphragm while air is being evacuated through the valve assembly. These vanes may protect against the bag material, or against large objects stored in the bag, but the vanes do not prevent small particles from entering the air holes and either blocking air holes or preventing the diaphragm from properly closing once evacuation is complete. Furthermore, small particles may be carried through the valve and become lodged in the vacuum producing device used to evacuate the storage container, thus affecting operation of the vacuum producing device.

Therefore the need exists for a reusable, collapsible, evacuable storage container that may store bulk items that include particles or granules.

SUMMARY

Embodiments of the invention are directed to collapsible, evacuable storage containers. These storage containers have a one-way valve assembly allowing air to pass out of a flexible, air-tight bag, but not to return to the bag through the valve assembly. A filter is configured to be fitted against the one-way valve assembly so that material in the bag does not pass into or through the valve assembly when air is evacuated from the bag.

In one embodiment of the invention, the filter is made to be compatible with an existing one-way valve assembly. A filter assembly is formed of a cylinder capped by a top portion. The top portion has air slots through which air passes before entering the one-way valve assembly. A filter element is placed in the filter assembly so that air passing through the air slots is filtered. Embodiments of the invention may include filter elements providing filtration for various particulate sizes.

In an embodiment of the invention, the cylinder of the filter assembly contains a plurality of slots so that the filter assembly may be placed over radial vanes on the valve body. These slots are formed so that when the filter assembly is pressed onto the valve assembly, a seal is formed between the filter assembly and the vanes. In one embodiment of the invention, an annular lip is positioned at the base of the cylinder. This lip is configured to seal the filter assembly against a corresponding inner wall of the valve assembly.

DETAILED DESCRIPTION

In the drawings that accompany this description, the same numbered elements shown in separate figures are intended to represent similar elements. The embodiment of the filter assembly shown in the accompanying drawings is intended to be fitted against an existing one-way valve in an existing collapsible, evacuable container. This container is known as a SPACE BAG, and is manufactured by NEW WEST PRODUCTS, INC. of Redwood City, Calif. Those skilled in the art will appreciate that embodiments of the filter assembly may be adapted for use with a wide variety of one-way valves and containers.

Figure 1:
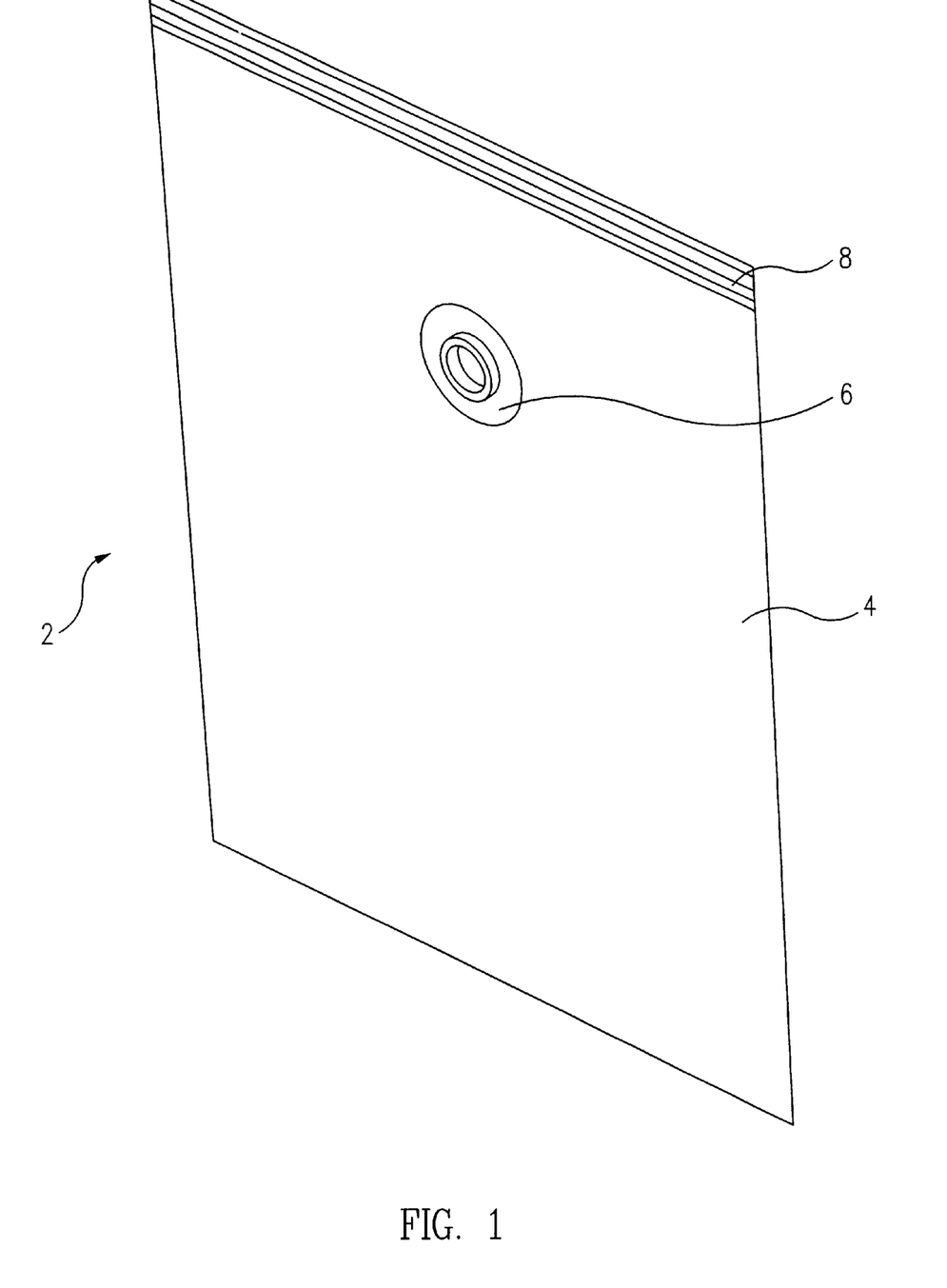
FIG. 1 is a perspective view of an embodiment of the invention.

FIG. 1 is a perspective view of an embodiment of the invention. An evacuable container 2 includes a bag 4, a valve assembly 6, and a seal 8. During use, one or more discrete articles or a bulk material may be placed in bag 4, after which bag 4 is sealed using seal 8. Air is drawn out of bag 4 through valve assembly 6 using a conventional vacuum source, such as a household or industrial vacuum cleaner. Valve assembly 6 and seal 8 maintain the vacuum inside bag 4 when the vacuum source is removed. Details regarding embodiments of valve assembly 6 are discussed in U.S. Pat. No. 5,480,030, mentioned above, and also in application 08/851,361 incorporated herein by reference in its entirety. Additional embodiments of valve assembly 6 are discussed below and shown in the accompanying drawings. In one embodiment, seal 8 is an interlocking air tight Zipper-type fastener manufactured by Minigrip/Zip-Pak (An ITW Company) of Mission Viejo, Calif.

Figure 2:
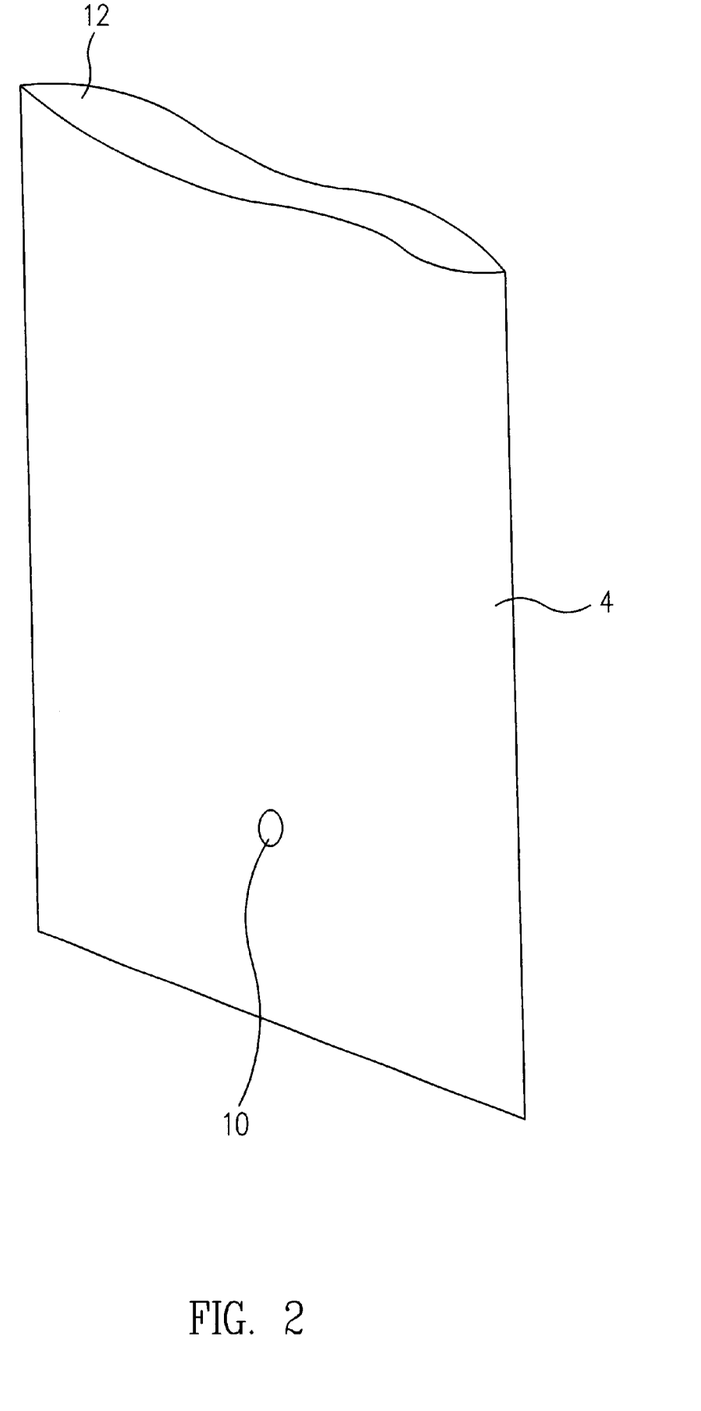
FIG. 2 is a perspective view of a flexible bag.

FIG. 2 illustrates an embodiment of bag 4. Bag 4 has a hole 10 in which to install valve assembly 6, and an opening 12 through which articles or bulk material may be placed for storage. Details regarding embodiments of bag 4 are discussed in U.S. Pat. No. 5,480,030, mentioned above. In one embodiment the bag is constructed of a blended extrusion layer of polyethylene sandwiched between a nylon layer and a layer of polyethylene sheeting. In some embodiments materials comprising the bag may be altered so as to prevent interaction with the bag contents. Such a custom bag composition is based on user need and may be determined using material qualities known in the art or by experimentation.

Figure 3:
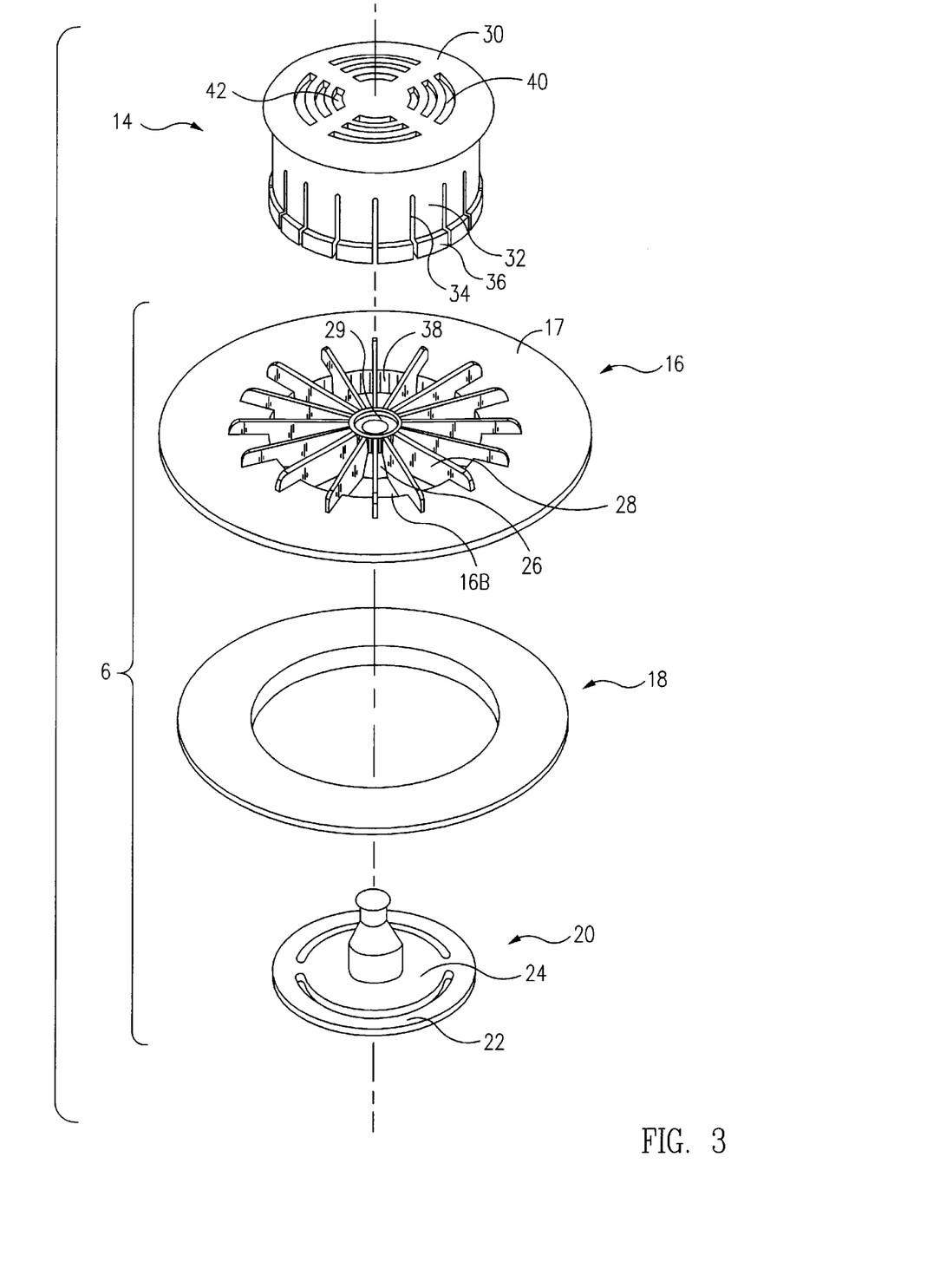
FIG. 3 is an exploded perspective view showing an embodiment of a valve assembly and of a filter assembly.

FIG. 3 is an exploded perspective view showing valve assembly 6 and filter assembly 14. As shown, valve assembly 6 is comprised of a base 16, a retaining ring 18, and a valve element 20. Valve assembly 6 is mounted to bag 4 (FIGS. 1 and 2) such that flange 17 of base 16 is on the inside of bag 4. Base 16 extends through hole 10 and is held in place by retaining ring 18 placed over base 16 on the outside of bag 4.

Valve element 20 provides the one-way feature in valve assembly 6. In the embodiment shown, valve element 20 is made of conventional clear polyvinylchloride (PVC). Valve element 20 has an outer annular portion 22 and an inner diaphragm 24. Annular portion 22 functions as a face against which a vacuum source, such as a conventional household or industrial vacuum cleaner nozzle (FIG. 6), may be sealed as the nozzle is pressed against base 16. When the nozzle is in place and a vacuum pressure draws air through the nozzle, diaphragm 24 flexes open and air passes through a plurality of holes 26 in base 16. When the nozzle is removed, diaphragm 24 returns to its original shape and seals against base 16, thus preventing air from passing back through holes 26.

Figure 5:
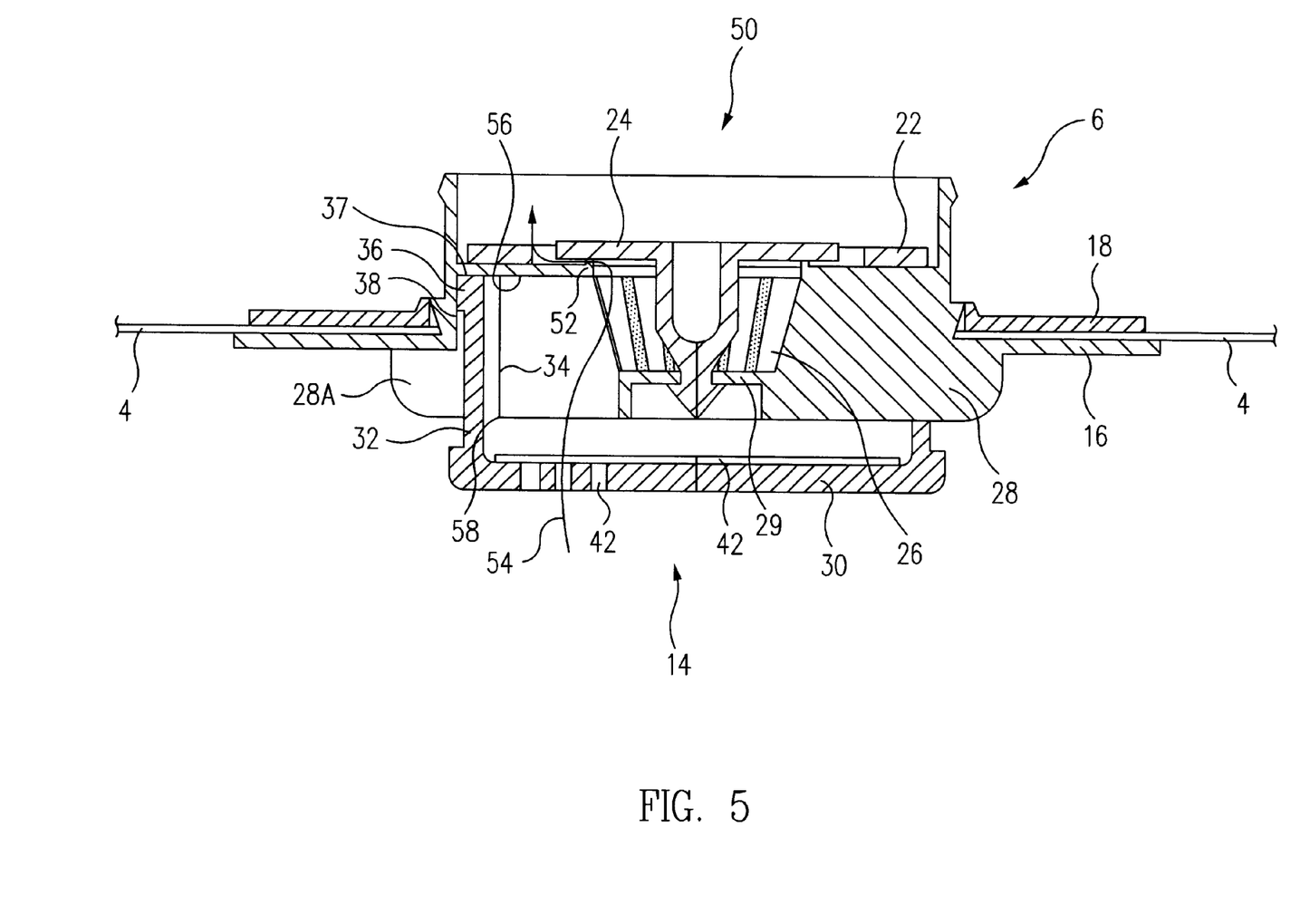
FIG. 5 is a cross-sectional view showing an embodiment of a filter assembly mated with a valve assembly.

As shown, a plurality of radial vanes 28 separate holes 26. Vanes 28 hold a central valve element support 29. Thus each of holes 26 is formed as the open space bounded by recessed portion 16B of base 16, two each of vanes 28, and valve element support 29. FIG. 5 provides another view of holes 26. As shown, vanes 28, spaced around support 29, are separated by holes 26.

Referring again to FIG. 3, filter assembly 14 fits against valve assembly 6. Filter assembly 14 is comprised of a top portion 30 and a cylindrical sidewall 32. Other embodiments may have different sidewall shapes, the sidewall being adapted for use with a particular valve base. As shown, filter assembly 14 fits against base 16 to form a seal tight enough to keep any material stored in bag 4 from passing into valve assembly 6. In some embodiments this seal may be air-tight. A plurality of slots 34 in filter sidewall 32 are configured to fit over respective vanes 28 in base 16. A raised annular lip 36 fits against base 16's inner wall 38. Details of the fit between filter assembly 14 and base 16 are discussed in detail below.

Filter assembly 14 has a plurality of openings 40 through which air passes while being drawn through valve assembly 6. As shown, openings 40 are arranged in a series of fan-shaped patterns having curved slots. Other embodiments of filter assembly 14 may use different shapes and patterns for openings 40. A filter element 42, visible for example through one of the openings 40, is placed underneath top portion 30 and underlies openings 40 to prevent stored material from entering valve assembly 6.

In one embodiment, filter assembly 14 is made of conventional polyethylene. In another embodiment, filter assembly 14 may be made of acrylonitrilebutadiene-styrene (ABS), known by trade names such as CYCOLAC or LUSTRAN. Some embodiments of the filter are injection molded. Other embodiments may be made using conventional fabrication methods such as milling. The material forming filter assembly 14 is soft, so that a slight deformation occurs as filter assembly 14 is pressed against base 16, as described below. The deformation provides both a seal and friction by which filter assembly 14 stays in place.

In one embodiment of the invention, filter element 42 is a 47 millimeter diameter, 0.02 micrometer PTFE membrane filter, supplied by Paul Gilman Laboratories of Fremont, Calif., as part S-66143, TF-200. The 47 mm filter element is then cut to slightly less than 1.34 inches so as to fit within filter assembly 14. Embodiments of this invention are not restricted to using this filter element type only, however, and other embodiments may use other filter element types. For example, filter element 42 may be optimized for a certain type of material to be stored within an evacuable container. User requirements may dictate filter element 42 composition. Filter element 42 may be attached to filter assembly 14 using various methods. For example, in one embodiment, filter element 42 is attached to filter assembly 14 using direct heat transfer. In other embodiments, sonic welding or other adhesive or connecting methods may be used. Filter assembly 14 may be permanently attached to base 16, or filter assembly 14 may detachable from base 16 in order to, for example, permit filter element 42 to be replaced.

As mentioned above, slots 34 are configured to fit over vanes 28. In some embodiments in which vanes are not used, however, slots 34 may be omitted. In one embodiment, each slot 34 is 0.060±0.002 inch wide and 0.47 inch long to ensure an adequate seal when filter assembly 14 is pressed onto base 16.

In the embodiment shown, a raised annular lip 36 is positioned around the base of sidewall 32. This lip 36 adds extra tension to the junction of, and improves the seal between, sidewall 32 and base 16. Annular lip 34 provides an improved seal between filter assembly 14 and base 16 over a seal between a straight edge junction of sidewall 32 and base 16.

Figure 4:
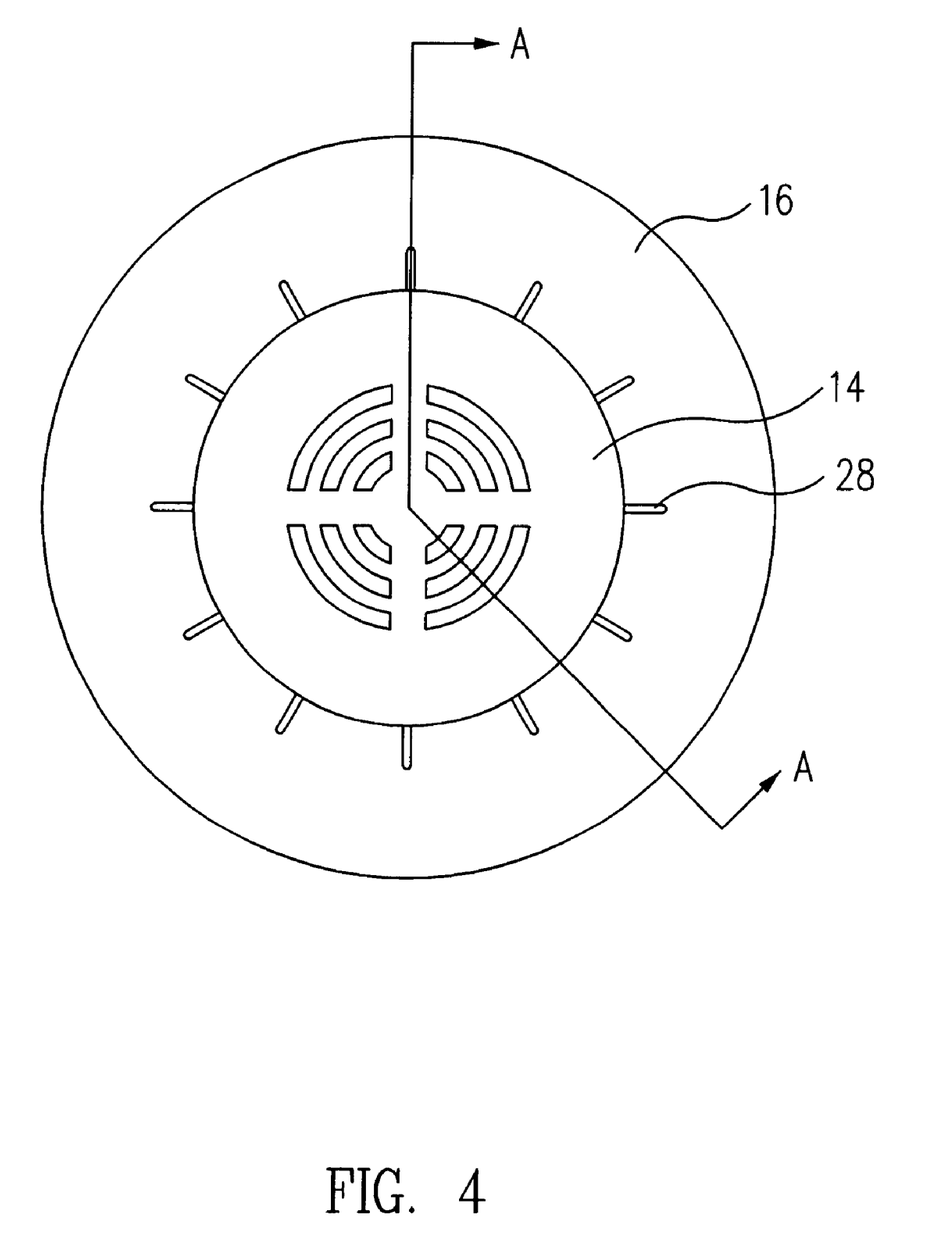
FIG. 4 is a plan view showing an embodiment of a filter assembly in position on a valve assembly.

FIG. 4 is a plan view showing an embodiment of filter assembly 14 mounted on an embodiment of base 16. As depicted, filter assembly 14 fits over a plurality of radial vanes 28 (partially hidden by filter assembly 14) positioned on base 16.

FIG. 5 is a cross-sectional view showing an embodiment of valve assembly 6 mated with filter assembly 14, taken at cut line A—A in FIG. 4. Valve base 16 is shown inserted through a flexible, air-tight bag 4 and held in place by an annular retaining ring 18. An opening 50 is provided in base 16 in which a nozzle (FIG. 6) from a vacuum source is placed to draw air through the valve. In some embodiments, a removable cap (not shown) may be placed over opening 50 to protect inner portions of valve assembly 6. A plurality of vanes 28 are positioned on the underside of base 16.

Flexible diaphragm 24 is shown in position against a seat 52. As described above, when a vacuum source nozzle is placed into opening 50, vacuum pressure causes diaphragm 24 to flex and allow air, represented by arrow 54, to be drawn through valve assembly 6. When the vacuum source nozzle is removed, diaphragm 24 returns to its position sealed against seat 52 so as to prevent air from flowing in a reverse direction through the valve. In the embodiment shown, diaphragm 24 and annular portion 22 are an integral piece, joined by two small bridge pieces (FIG. 3).

As mentioned above, further details regarding evacuable containers and one-way valves are given in U.S. Pat. No. 5,480,030, and in application Ser. No. 08/851,361.

Still referring to FIG. 5, filter assembly 14 is shown mated with valve base 16. Lip 36 is shown sealing sidewall 32 against valve base inner surface 38. As shown, filter assembly 14's sidewall bottom surface 37 is shown sealed against base 16's surface 56, although in other embodiments a slight gap is allowable due to the seal between lip 36 and surface 38.

Also shown is a vane 28A extending through a slot 34 in filter assembly 14. It may be seen that the length of slot 34 should not exceed the height of a vane 28, or else leakage may occur near the top junction 58.

Filter element 42 is shown attached to the underside of filter assembly 14's top portion 30. Filter element 42 is positioned so that air, represented by arrow 54, is filtered as it passes through each of the several air holes 40.

Figure 6:
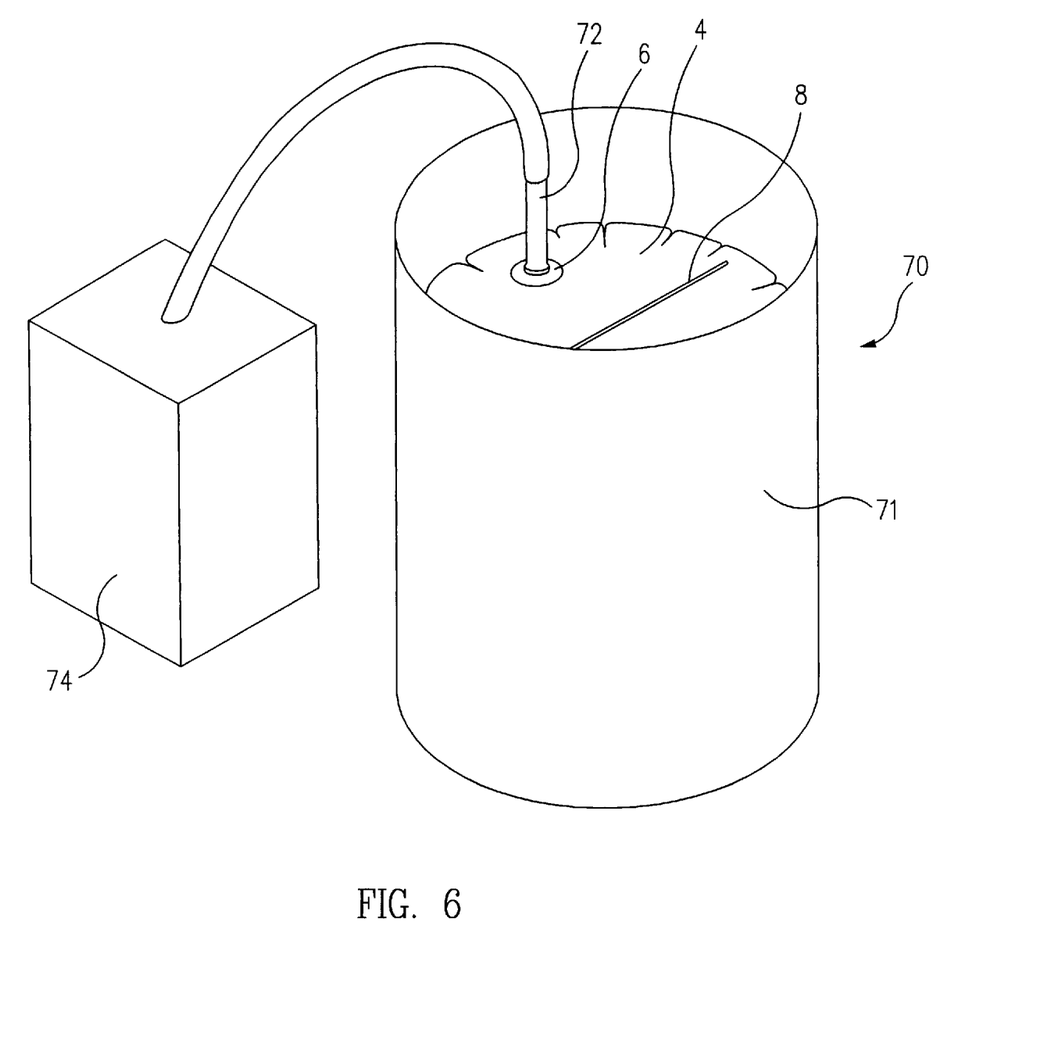
FIG. 6 is a perspective view showing another embodiment of the invention.

FIG. 6 is a perspective view showing an embodiment of the invention during use. A container 70 is shown having a bag 4 placed in a rigid vessel 71 to allow easier handling of a stored bulk material such as a powder or granules. The rigid vessel should be strong enough to hold the desired bulk contents during routine handling. In some embodiments the rigid container may be a conventional container made of plastic, corrugated fiber, bonded fiber, wood, or metal. In other embodiments the container may be custom-fabricated to meet user needs. In some embodiments, the rigid vessel 71 may be omitted.

Stored material may be placed in bag 4 so as to fill vessel 71. As shown, however, a portion of stored bulk material has been removed from bag 4, illustrating the reusable nature of the evacuable container 70. Bag 4 has been sealed with seal 8. A nozzle 72 from a vacuum source 74 is placed, by hand for example, against valve assembly 6. As described above, vacuum source 74 draws air out from bag 4 through valve assembly 6. When sufficient air has been withdrawn from bag 4, nozzle 72 is removed and both valve assembly 6 and seal 8 prevent air from reentering bag 4. If at a later time an additional portion of material stored in bag 4 is to be taken, seal 8 is opened, the material is removed from bag 4, and then bag 4 is resealed and reevacuated as described.

An advantage of embodiments of this invention is that it provides a reusable, evacuable container for granular or powdered bulk material. Such bulk materials may include items such as nylon resins, tea, cork, and foam products. Embodiments of the filter assembly prevent the bulk material from entering and clogging both valve assembly 6 and the vacuum source used to evacuate bag 4.

Another advantage of the embodiment shown and described is that filter assembly 14 may be removed and replaced with a fresh assembly if the filter element 42 becomes clogged. As shown in FIG. 6, a user opens seal 8 and reaches into bag 4 to remove and replace filter assembly 14. In other embodiments, however, filter assembly 14 may be permanently attached to, or formed as an integral part with, valve assembly 6.

What is claimed is:

1. A container comprising:
   a flexible, air-tight bag having an opening for inserting an item to be stored into said bag;
   an air-tight seal across said opening;
   a one-way valve assembly installed in a surface of said bag, wherein said valve assembly comprises a plurality of vanes and allows air to pass out of said bag but prevents air from entering said bag; and
   a filter assembly mated with said valve assembly, wherein said filter assembly has at least one hole formed therein and supports a filter element across said at least one hole such that air passing out of said bag through said valve assembly is filtered, and wherein said filter assembly is configured to fit over, and form a seal with, said vanes.

2. The container of claim 1 wherein said filter assembly is held against said valve assembly by friction.

3. The container of claim 1 configured so that said filter assembly may be removed from said valve assembly and replaced with a second filter assembly.

4. The container of claim 1 wherein said filter assembly comprises:
   a cylindrical side wall having an outside surface and a first end;
   a top portion positioned as a cap over said side wall at said first end; and
   a raised annular lip positioned on said outside surface at an end opposite said first end,
   wherein said annular lip is configured to seal against a surface of said valve assembly.

5. The container of claim 1 wherein said valve assembly and said filter assembly are an integral piece.

6. The container of claim 1 wherein said filter element is configured to prevent particles of a material stored in said bag from entering said valve assembly.

7. The container of claim 1 wherein said filter element is a 0.02 micrometer filter.

8. The container of claim 1 further comprising a rigid vessel, wherein said bag is placed inside said vessel.

9. A container comprising:
   a flexible, air-tight bag having an opening for inserting an item to be stored into said bag;
   an air-tight seal across said opening in said bag;
   means for allowing air to pass out of said bag, but not to pass into said bag; and
   means to filter air passing out of said bag;
   wherein said means to filter comprises a filter body having a cylindrical sidewall capped at one end, wherein said sidewall contains a plurality of slots configured to receive vanes in an air valve body, and wherein said filter body has at least one opening and supports a filter element filtering air passing through said opening in said filter body.

10. The container of claim 9 wherein said sidewall has a raised annular lip configured to seal against a surface of a valve body.

11. The container of claim 9 wherein said means to filter is configured to be held in place against a valve body by friction.

* * * * *